Oct. 4, 1966 W. J. HOLT ETAL 3,277,394
TEMPERATURE COMPENSATED ELECTROMECHANICAL RESONATOR
Filed March 12, 1963 3 Sheets-Sheet 1
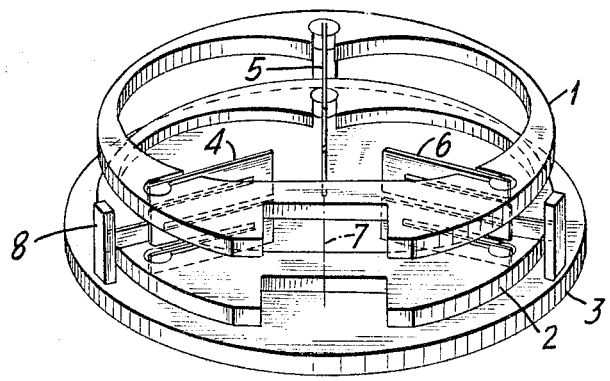
FIG. 1
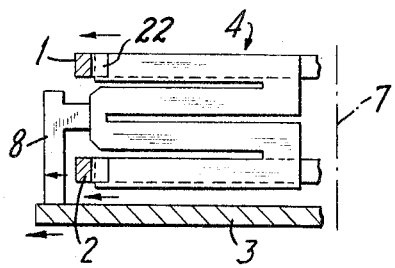 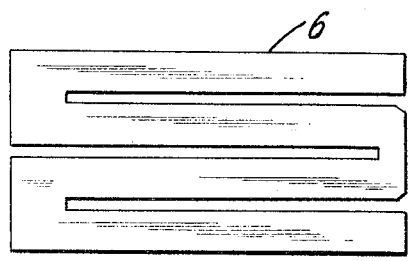
FIG. 2  FIG. 3
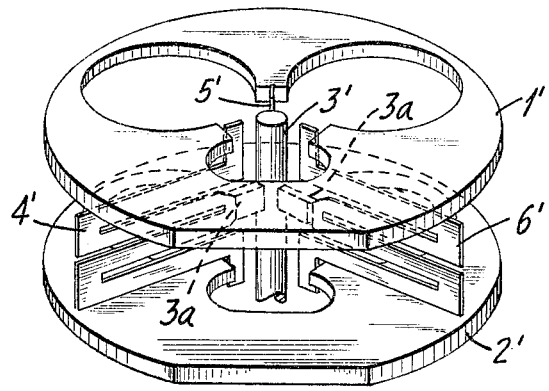
FIG. 5
INVENTORS
WILLIAM J. HOLT
MICHAEL V. BRAINE
BY
Davis, Hoxie, Faithfull & Hapgood
ATTORNEYS

United States Patent Office 3,277,394
Patented Oct. 4, 1966

3,277,394
TEMPERATURE COMPENSATED ELECTRO-MECHANICAL RESONATOR
William J. Holt, Pacific Palisades, and Michael V. Braine, Malibu, Calif., assignors to The United States Time Corporation, Waterbury, Conn., a corporation of Connecticut
Filed Mar. 12, 1963, Ser. No. 264,569
3 Claims. (Cl. 331—116)

The present invention relates to timekeeping devices and more particularly to a novel structure and circuit for an electronic watch and to a method of constructing that structure.

At the present time electronic watches, as distinct from electric watches using make-and-break contacts, employ a vibrating element, for example a tuning fork, whose timekeeping ability is adversely affected by gravity and by external shocks. The vibrating element is usually constructed of relatively expensive material so as to be little affected by temperature changes. Such vibrators have a single take-off pawl which unequally loads and dampens the tine to which the pawl is attached.

It is the objective of the present invention to provide an accurate watch movement which is constructed of relatively inexpensive materials, whose timekeeping ability is not adversely affected by external shock or by changes in temperature, and which is sturdy and inexpensive to manufacture.

In accordance with the present invention, a watch is provided using the resonator of Holt's United States Patent 2,939,971. In the Holt patent two vibrating elements (rings) mounted on tines (flat springs) are driven simultaneously in opposite rotational direction about a common axis. In the structure of the present invention, the attachment points of the rings to the tines are at the same radial distance from the axis as the attachment points of the tines to the base, which provides for temperature compensation. The rings are oppositely driven by a coil attached to one ring and a magnet to the other. A blocked oscillator circuit using a single transistor pulses the coil. The pick-up (sensing) coil and magnet move with the rings so that the pick-up pulse is an average of the ring's movements, which allows for displacement of both rings relative to the case. The mechanical take-off uses two pawls, one attached to each ring, so that the damping and load effects of the pawls on the rings are equalized. Preferably three tines are used so that they are under equal stress and their natural frequency is the same. In the manufacture of the resonator, a knob is attached to the ends of the tines by a strong molecular bond and the knobs are then fastened, for example by glueing, to the rings.

Other objectives of the present invention will be apparent from the following detailed description of its preferred embodiment, taken in conjunction with the accompanying drawings in which:

FIG. 1 is a perspective view of one embodiment of the resonator of the present invention;

FIG. 2 is a partial side cut-away diagram of the resonator of FIG. 1;

FIG. 3 is an enlarged side plan view of a tine used in the resonator of FIGS. 1 and 2;

FIG. 5 is a perspective view of another resonator structure of the present invention;

Figure 4:
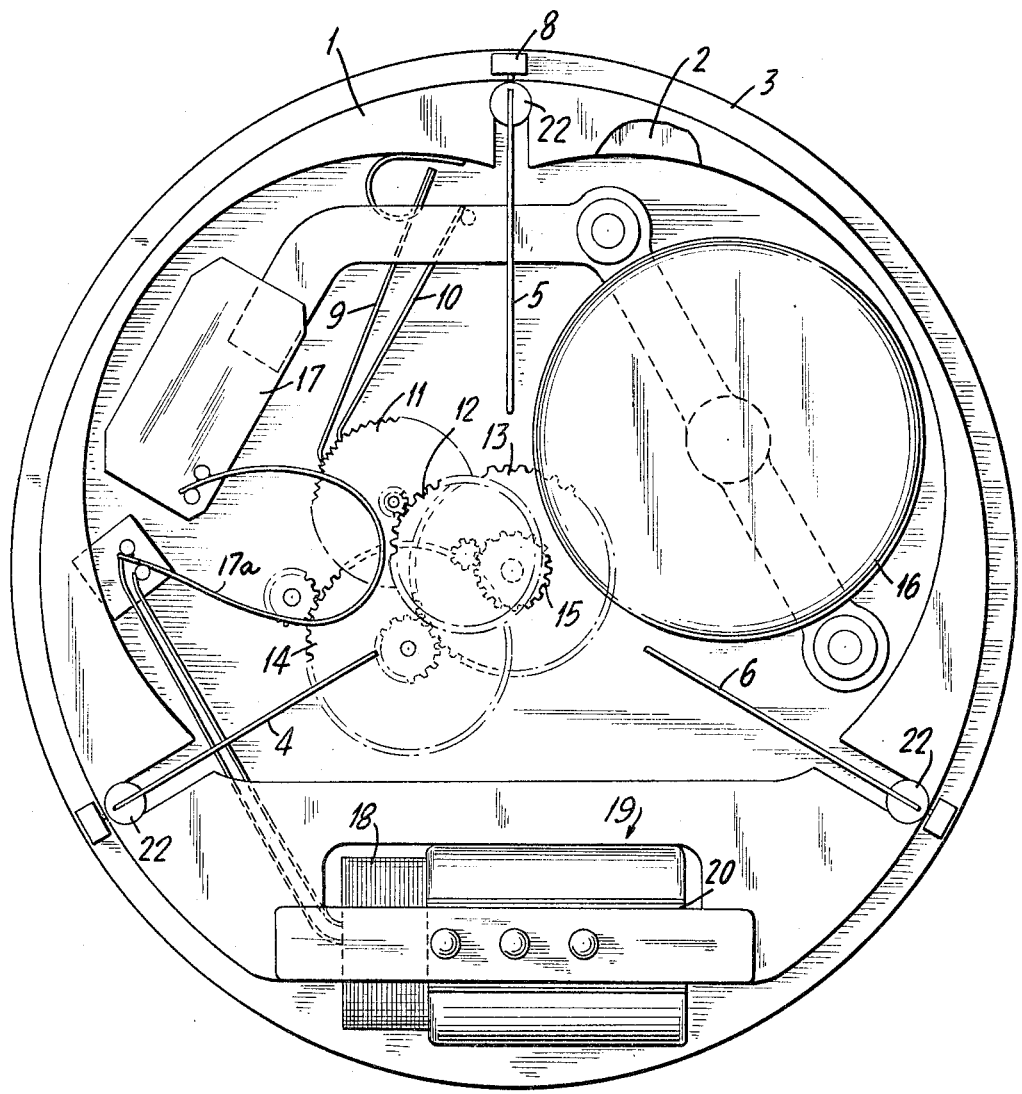
FIG. 4 is a top plan view of the resonator shown in FIG. 1 used in a watch.

The resonator structure shown in FIGS. 1 and 2 includes a top ring 1, a bottom ring 2, a base 3 adapted for attachment to the watch case, and three tines 4, 5 and 6 spaced radially equidistant from each other and radiating from the imaginary axis 7 of the rings 1 and 2. The tines are of spring metal, preferably such as the nickel-chromium alloy "Elinvar" or the nickel-chromium-titanium alloy "Ni-Span-C," which has a constant isoelastic modulus so the tines are not affected by temperature changes likely to be encountered in a watch. The ideal metal for the tines would have its coefficient of modulus and coefficient of expansion equal and opposite. It is possible to make rings 1 and 2 of materials having a very low coefficient of expansion with temperature, but such materials are expensive. If the rings are of non-compensating temperature material and mounted as shown in the Holt patent, they would expand with heat, thereby increasing the stress on the tines and raising the tines' frequency. For accurate time-keeping, it is essential that the resonator's frequency be constant. As shown in FIG. 2, the base 3 is below resonators 1 and 2 and has upraised flange portion 8 to which the tines are attached. The base may, in the alternative, be centrally positioned between the rings to provide a more rugged mounting. In FIG. 2, the arrows show the direction of movement of the rings and base of the structure of FIG. 1 upon a rise in temperature. As shown, the rings 1 and 2 and the flange 8 move radially away from the central axis 7. As the rings and the flange move in the same direction and in the same amount, there is no increase in stress placed on the tines. When the watch is cooled, the movement is in the opposite direction and again there is no increase in stress on the tines. The rings and base may therefore be of relatively inexpensive temperature non-compensating material, such as brass, and yet the resonator structure as a whole be self-compensating for temperature changes.

FIG. 5 shows another embodiment of the self-compensating resonator structure of the present invention. The rings 1' and 2' are not flexible and are connected near their center to flexible tines 5', 6' and 4'. The tines are W shaped and are each joined to the central hub 3' at point 3a. The joints 3a are at the same radius from the center of the rings as the joints of the tines with the rings. The same type of temperature self-compensation occurs as with the structure of FIGS. 1 and 3.

As shown in FIG. 4, the watch structure, in addition to the parts shown in FIG. 1, includes the pawl 9 attached to ring 1, the pawl 10 attached to ring 2, index wheel 11 driven by the pawls, reduction wheel 12 driven by the index wheel and the other gear wheels of the conventional time chain including an hour wheel 13, a minute wheel 14 and a sweep-second wheel 15. The watch is powered by the battery 16 which is connected to electronic circuit 17. The circuit 17 is connected to coil 18 by a flexible conductor 17a, for example a thin plastic such as Mylar which has been tin plated. The coil is hollow and is mounted on ring 1. A cup-shaped permanent magnet 19, having a central pillar 20 protruding from its base within the cup, is attached to ring 2 so that its pillar moves in and out of the coil. If desired, only the pillar 20 need be of magnetic material and the cup may be of an unmagnetized but magnetic flux conducting metal.

The rings 1 and 2 rotate at the same time but in opposite directions. The pawl 9 is therefore driving the index wheel while the pawl 10 is being lifted, the pawls being of spring steel. When pawl 10 is driving, pawl 9 is lifted. This is the so-called Lagarousse Ratchet mechanism. Back-lash (counter rotation) of the index wheel due to the friction of the non-driving pawl is avoided as the wheel is constantly being driven by either one pawl or the other. Since a separate brake mechanism or click isn't needed to avoid back-lash, there is a saving in energy. As both resonator rings are driving equally, both rings are equally loaded and equally damped. The use of two pawls also permits the use of a larger index wheel having wider tooth spacing than if only one pawl were used. For example, the tooth spacing is preferably 0.003 inch. This type of wheel is less expensive than a wheel having smaller teeth.

The tines are mounted to the rings 1 and 2 and to flange 8 by a special method. It has been found with the high vibration frequencies required for timekeeping, such as 96 cycles per second, that the tines, unless properly joined to the base, fatigue and break their joints. Such fatigue is avoided if the strength of the joint between the tines and the rings equals the strength of the tines. The tines cannot, however, be brazed to the ring, as brazing would heat the ring and cause stresses to be set up within it. In the method of the present invention, a small knob 22 (slug) is brazed or welded to the ends of the tines, see FIG. 2. The brazing forms a molecular bond between the tine and the slug. The slug is then inserted in a circular opening in the ring and the slug cold glued to the ring, for example by epoxy cement. The shearing stress between the knob and the ring is distributed over the relatively large area between them, while the bending stress of the tine is against its joint with the knob.

As shown in FIGS. 1-4, preferably three tines are used in the resonator structure. It is important for accurate timekeeping that the stress on the tines, and therefore their frequency, be equal. If one or two tines are used, the weight of the rings will place different loads on them, depending upon their position relative to gravity. If three or more tines are used and equally spaced radially, the stress is distributed so that its total over the tines is the same regardless of the position of the resonator. If, however, more than three tines are used, it is difficult to place all the tines under the same initial stress, but with three tines that step is simply accomplished.

Figure 6:
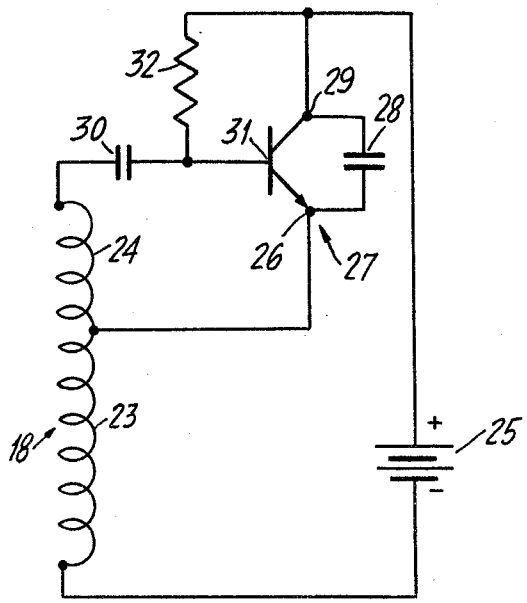
FIG. 6 is a schematic diagram of the circuit of the present invention.

The electronic circuit for driving the resonators is shown in FIG. 6. The coil 18 is tapped at a mid-way point to form electrically a separate drive coil 23 and sensing (pick-up) coil 24. The drive coil is connected between power source 25 (a battery, solar cell or thermocouples) and emitter 26 of PNP transistor 27. A condenser 28 is connected between the transistor's emitter 26 and its collector 29. The sensing coil 24 is connected in series with a condenser 30 and the condenser and coil connected between emitter 26 and base 31. A resistor 32 is connected across the base 31 and the collector 29. The resistor 32 dissipates the bias on the transistor's base if the rings are unable to drive each other due to an external shock. An example of suitable circuit values are as follows:

| | |
|---|---|
| Coils 23 and 24 | 30,000 ohms. |
| Transistor | Type SNT4. |
| Condenser 28 | .01 mfd. |
| Resistor 32 | 2 meg. |
| Condenser 30 | .22 mfd. |
| Battery | 1.6 volts. |

Figure 7:
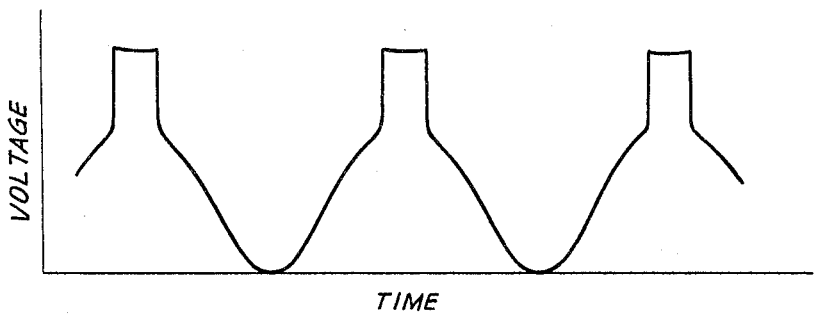
FIGS. 7 and 8 are charts showing the voltage and current pulses of the circuit of FIG. 6.
Figure 8:
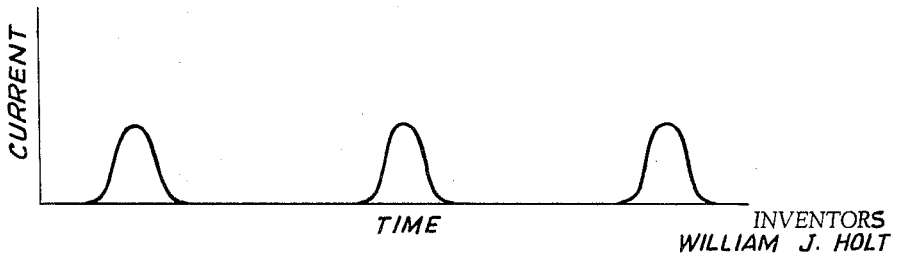

The voltage vs. time and the circuit vs. time curves of this circuit are shown in FIGS. 7 and 8, respectively. The circuit operates as a triggered blocked oscillator and supplies the full battery voltage at the peaks of its pulses. For an explanation of this type of oscillator, see Seely, Electron-Tube Circuits (1958) pgs. 435-440 and 443, and Millman, Pulse and Digital Circuits (1956) pgs. 272-284 and 602-604. It is necessary, in order to achieve this type of action, that the resistance of the drive coil be relatively low so that the back E.M.F. of the coil's interaction with the magnet is considerably below the forward current.

Modifications may be made in the invention within the scope of the subjoined claims.

We claim:
1. In a watch, a resonator including first and second rings of temperature sensitive material, a base of temperature sensitive material, and a plurality of flexible tines of temperature compensating material supported on said base and attached to and supporting the rings in parallel planes to each other and means to resonate said rings simultaneously in opposite directions about a common axis, wherein the attachment points between the tines and the base and the tines and the rings are at substantially the same radial distance from the axis.

2. A resonator as in claim 1 having three tines.

3. A resonator as in claim 1 wherein a coil is attached to the first ring, a magnet is attached to the second ring, the magnet extends into the coil in its rest position and the watch includes a power source and electronic means in the watch to periodically pulse the coil with current from the power source.

References Cited by the Examiner

UNITED STATES PATENTS

| | | | |
|---|---|---|---|
| 2,292,244 | 8/1942 | Smith | 58—108 |
| 2,530,427 | 11/1950 | Fredrick | 331—149 |
| 2,538,261 | 1/1951 | Moore | 331—149 |
| 2,628,343 | 2/1953 | Murray | 310—16 |
| 2,831,114 | 4/1958 | Van Overbeek | 331—116 |
| 2,843,742 | 7/1958 | Cluwen | 331—149 |
| 2,936,572 | 5/1960 | Biemiller et al. | 58—108 |
| 2,939,971 | 6/1960 | Holt | 310—15 |
| 3,192,701 | 7/1965 | Tanaka et al. | 310—25 X |
| 3,201,932 | 8/1965 | Sparing et al. | 310—25 X |

MILTON O. HIRSHFIELD, *Primary Examiner.*

LEO W. SMILOW, ORIS L. RADER, *Examiners.*

G. F. BAKER, C. W. DAWSON, D. F. DUGGAN,
*Assistant Examiners.*